Aug. 30, 1932.  E. E. PIERCE  1,874,118
MEANS OF ATTACHING TOGETHER A WINDSHIELD CLEANER ARM AND BLADE
Filed Nov. 20, 1931
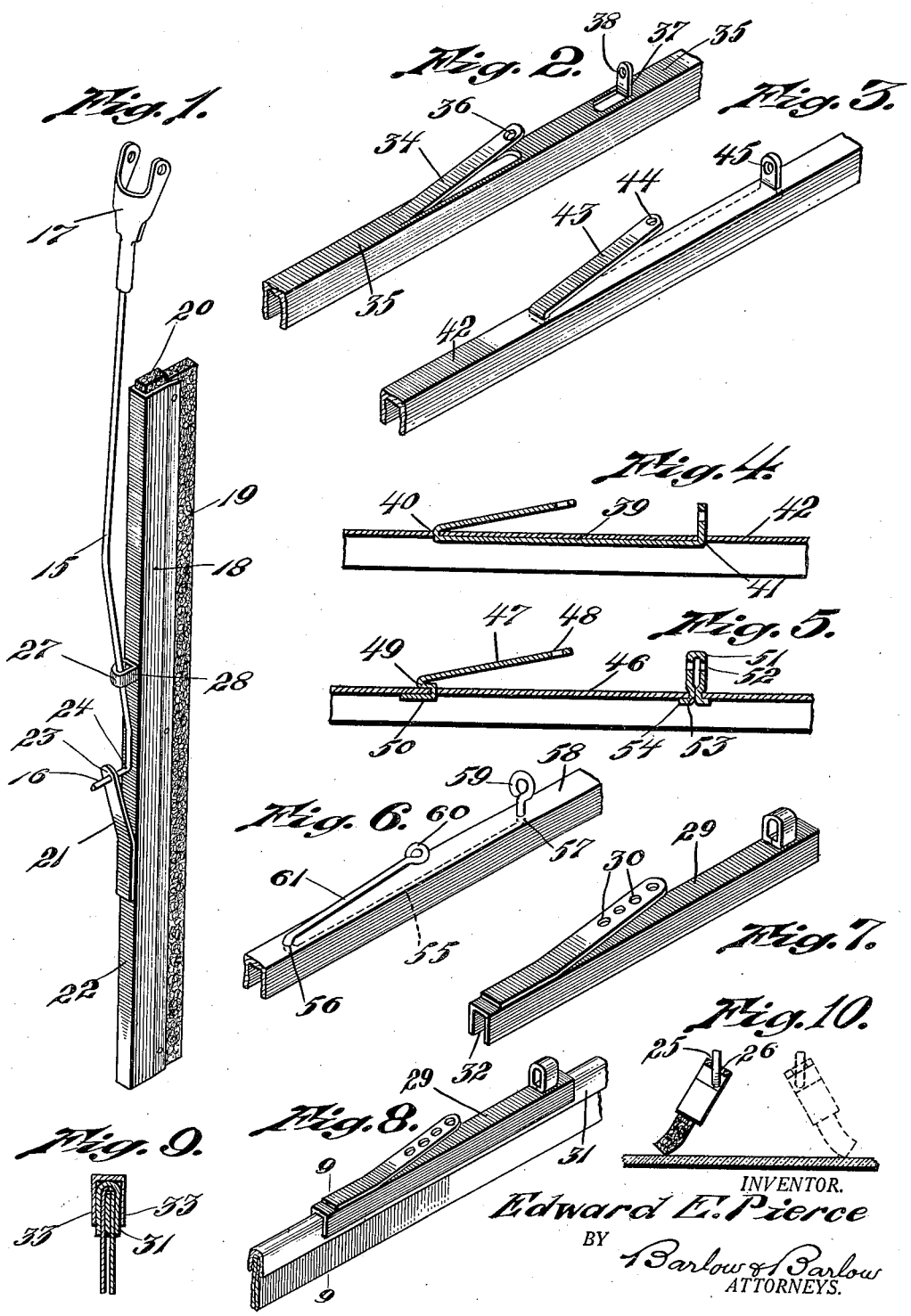
INVENTOR.
Edward E. Pierce
BY
Barlow & Barlow
ATTORNEYS.

Patented Aug. 30, 1932

1,874,118

UNITED STATES PATENT OFFICE

EDWARD E. PIERCE, OF EXETER, RHODE ISLAND

MEANS OF ATTACHING TOGETHER A WINDSHIELD CLEANER ARM AND BLADE

Application filed November 20, 1931. Serial No. 576,301.

This invention relates to a windshield cleaner and more particularly to the mounting of the wiper blade on the arm.

One of the objects of this invention is to provide a detachable mount for the blade and arm, which will permit a drag of the blade along the glass at an acute angle thereto in its oscillating movement in both directions along the surface of the glass with a flop or wobble of the blade at the ends of the stroke of the arm.

Another object of this invention is the provision of a resilient member to engage a finger provided on the arm and maintain the wiper and arm in engagement independent of any pressure exerted by the arm toward the glass.

A further object of this invention is to provide a construction of attaching means by which the wiper blade may be attached to any arm regardless of its shape or inherent spring tension.

A still further object of this invention is the provision of a construction which may be inexpensively manufactured, easily assembled, and one which will be strong and durable in construction.

With these and other objects in view, the invention consists of certain novel features of construction, as will be more fully described, and particularly pointed out in the appended claims.

In the accompanying drawing:

Fig. 1 is a perspective view of a wiper blade and arm in assembled position, the same being attached by my improved construction.

Fig. 2 is a perspective fragmental view showing the attaching means as formed from the stock of the wiper blade rather than formed separately and attached thereto as shown in Fig. 1.

Fig. 3 is a perspective view of a fragmental portion of a wiper blade with a different modified construction of mounting means provided thereon.

Fig. 4 is a section of the construction shown in Fig. 3.

Fig. 5 is a central sectional view of another different modified construction of the mounting means.

Fig. 6 is a perspective view of a still different modified construction formed in the manner illustrated in Figs. 3 and 4 but provided from round wire instead of flat stock.

Fig. 7 is a perspective view of the mounting means as provided on a separate channel member, which channel member may itself be secured to the wiper blade.

Fig. 8 is a perspective view showing the construction of Fig. 7 as mounted on the wiper blade.

Fig. 9 is a section on line 9—9 of Fig. 8.

Fig. 10 is an end view partly in section, illustrating the angular relation of the arm and blade and also the angular relation of the blade with reference to the plane surface over which it travels.

In the use of windshield cleaners it has been found desirable to provide a wiper blade which may be detached from the oscillating arm for replacement or repairs, which detachment may be afforded without the use of tools; also it is desirable that the wiper blade flop or wobble with reference to the oscillating arm at the end of the stroke of the arm so that at the beginning of each stroke it will trail and drag along behind the wiper arm at an acute angle to the glass surface to better clean the surface, and I have also found it desirable to provide a construction which may be secured to any wiper arm and accordingly I have provided a resilient member which may be lifted by flexing to engage the end finger of a wiper arm, and I have provided a guide or retaining member spaced from this finger to assist in maintaining the desired relative position of the arm and the blade, by which construction the blade may be easily detached or attached to the arm and by which construction there is sufficient amount of play in the eye or opening through the resilient member to permit a relative movement of the blade with reference to the arm so that it may drag and flop or reverse its position with reference to the glass at the end of each stroke in order that the blade may drag in both directions; and the following is a detailed description of the present embodiment of this invention illustrating the preferred means by which these advantageous results may be accomplished.

With reference to the drawing, 15 designates the wiper arm which may be of any desired shape so long as it is provided with a finger or angularly extending portion 16, preferably at its lower end. The arm may be attached by means of a bifurcated member 17 to a motor shaft for oscillating the arm in any usual or accustomed manner.

The wiper blade is designated 18 and in the construction here shown consists of a hollow metal portion which may contain a desired liquid and a contact strip of absorbent material 19, such as felt or the like, for causing this liquid to be spread over the glass, the liquid being such as alcohol or the like to prevent accumulated moisture from freezing. A plug 20 at the upper end of the hollow portion provides a means for closing the filling opening to the hollow portion with the desired liquid. It is of course understood that this particular type of wiper blade is not the subject of my invention but that my invention relates more particularly to the means of mounting or securing this blade on the wiper arm 15 to secure the proper detachable connection and the desired limited relative angular movement of the blade in its oscillation in both directions.

The primary thought in the functioning of my attaching means is that I have an opening through which the finger 16 may extend, the opening being of such a dimension that a limited relative rocking movement of the blade with reference to the arm will be permitted, and it is also essential that this means be such that it may be moved relative to the part to which it is secured to permit detachment of the finger. I also provide a guide or retaining strap to assist in maintaining the desired relation of the wiper blade and the arm.

I have shown several different means of accomplishing this desired result; in Fig. 1 the member 21 is secured to the back 22 of the blade 18 by any suitable means such as solder to rigidly secure one end of the member to the blade but permit the larger portion thereof to spring away from the back 22 due to its inherent resiliency to permit the insertion of the finger 16 through an opening 23 in the member 21. This opening is such as to permit a relative rotary movement of the arm 15 with reference to the wiper which would tend to turn the finger 16 about its heel 24 as a center point, but as the opening through which this finger extends closely fits the finger, a binding of the member at the edge of its outer surface 25 and the edge of its inner surface 26 will occur which will jam the finger in the opening and limit the movement of the wiper blade at a position such that it will form an acute angle with the glass, as illustrated in Fig. 10 during the movement of the arm in one direction, whereas the movement of the arm in the other direction will cause this drag to be reversed, the finger jamming in the opening at the opposite angle, as illustrated also in Fig. 10 to permit this drag or angular relation of the wiper blade in its movement in the opposite direction. By this arrangement the arm cannot be withdrawn from the opening 23 because of its contact with the back of the blade 22 and thus so long as the relation of the arm and blade are maintained substantially as illustrated in Fig. 1, the engagement of the parts is assured and the flop will be permitted. Although the resiliency of the member 21 permits a springing of the end portion outwardly to withdraw the finger 16 from the opening 23 for detachment of the blade from the arm or for assembly of the arm and blade as desired, the member will remain in substantially the position illustrated due to its inherent resiliency.

In order that the relation of the arm and the blade will be maintained, as illustrated in Fig. 1, to cause the functioning of the blade and arm as desired, I have provided a strap member 27 which prevents the arm from swinging away from the wiper in the plane of the wiper and arm and also forms a guide, the side walls 28 of which prevent swinging of the arm about the finger 16 as a pivot point. This member 27 is formed substantially an inverted U shape with its ends turned in to provide an attaching surface and may be secured to the back of the windshield wiper blade in any suitable manner such as by solder as illustrated in Fig. 1, or the retaining member may be formed in other suitable ways as will hereinafter appear.

The opening beneath this strap member 27 is sufficient to permit passage of the wiper arm therethrough for insertion or for removal after the finger 16 has been disengaged from the opening 23. A large variety of relative movements of the blade and arm are permitted when the finger 16 is disengaged from the opening 23, by manual manipulation for withdrawing the arm through the strap member 27 for detachment of the parts one from the other.

I have illustrated in Fig. 1 the mounting means as secured at spaced points on the wiper at either side of the middle thereof and by reason of this arrangement the wiper is better supported and the strain better distributed than if the entire connection and engagement is located at or closely adjacent the middle of the wiper.

Also in Fig. 1, I have illustrated separate members secured to the back of the wiper to function as an attaching means, but it will be readily apparent that various other ways of attachment may be had. In Fig. 7 I have illustrated the attaching means which I have just described in connection with Fig. 1 as mounted on a channel member 29, the resilient member of which is provided with additional openings 30 along its length. The channel member 29 may be of any desired length and is adapted to be secured to a wiper blade 31, such as illustrated in Fig. 8, by merely slipping the blade into the channel 32 of the member 29 and compressing the side walls 33 thereof to tightly engage the back of the blade 31 and hold the same in mounted position.

Other forms of construction are illustrated in Figs. 2 to 6 inclusive, which may be either formed directly associated with the back of the wiper or formed on a separate attachable piece as illustrated in Figs. 8 and 9. The form shown in Fig. 2 consists of the resilient member 34 as being cut and raised from the back 35 of a channel section member which is provided with an opening 36 for the reception of the finger 16 as desired, while a retaining member 37 is also cut and raised from the stock 35, and is provided with an opening 38 through which the arm 15 may be passed for securing the wiper blade and arm in assembled position.

In Figs. 3 and 4 I have illustrated the attaching means formed from a single strip 39 which is passed through openings 40 and 41 in the back 42 of a channel member. The resilient securing portion 43 extends above and away from the back 42 and is provided with an opening 44, while the retaining member passes up through the opening 41 and is provided with an opening 45 through which the arm may be passed.

In Fig. 5 I have illustrated separately formed members providing my attaching means, but have secured these by suitable deflections or formations of the stock to the back 46 of a suitable channel member. The member 47 is provided with an opening 48 to receive the finger 16, and it is bent upon itself as at 49 to provide a portion 50 to extend along beneath the channel and prevent detachment thereof, while a retaining member is formed by bending a piece of stock upon itself to aligned openings 52, and its free ends bent together as at 53 and then apart as at 54 to fasten it to the back of the channel 46.

In Fig. 6 a wire 55 of desired cross section is passed up through openings 56 and 57 in the back 58 of a channel with its end portions subsequently formed in eyes as at 59 and 60 so located as to provide a long arm 61 upon which the eye 60 will function to receive the finger 16, while the retaining eye 59 will function to retain the arm in the desired position as above pointed out.

In all of the various structures described, I provide a resilient securing member and a retaining member. In mounting the wiper blade on the arm, the finger 16 is passed through the retaining strap designated 27 in Fig. 1 and then by proper manipulation and flexing outwardly of the resilient securing member 21 I pass the finger through the opening 23 therein, which, when released, moves back by its inherent resiliency to a position intermediate the ends of the finger and secures the wiper in assembled relation on the arm.

All of these several forms will permit of a rocking or flop of the wiper blade with reference to the arm to a limited extent by the jamming of the finger in the opening in the resilient member, while the arm is detachably connected by reason of the resilience of this member. Thus I have provided an attaching means which may be secured and which may be either separately formed or may be an inseparable part of the wiper blade, and when connected the arm is held in its proper alignment and as the attachment and strain is exerted on the wiper blade by means of the oscillation of the arm at points on either side of the middle of the arm, a blade of a strong and durable construction is provided and one which is well supported, the same also being simple and inexpensive to manufacture.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a windshield cleaner, a wiper, an arm provided with an angularly extending finger at its end, means for securing together said wiper and arm comprising a member on said wiper and in substantially a single plane having an opening therein through which said finger extends, the lateral edges at the opposite surfaces of said member opening engaging said finger, said opening being of a size to permit but limit the relative rocking movement of the arm and wiper, and means on the wiper for guiding the arm at a point spaced from the first said means.

2. In a windshield cleaner, a wiper, an arm provided with an angularly extending finger at its end, means for securing together said wiper and arm comprising a resilient member on the wiper having an opening therein to receive said finger and a strap on the wiper spaced from said resilient member and embracing said wiper arm to maintain the wiper and arm in substantially the same plane and in generally parallel relation.

3. In a windshield cleaner, a wiper, an arm provided with an angularly extending finger at its end, means for securing said wiper and arm together comprising a strap member mounted on said wiper embracing said arm at a point spaced from the finger end, said strap being sufficiently loose to permit the arm to turn about is own axis therein but preventing relative swinging movement in either direction, and a member mounted on said wiper provided with an opening, the edges of which opening both engage said finger in substantially a single plane transversely of said finger to cause jamming of the finger in said member after a predetermined relative rock of the wiper and arm in either direction, whereby the wiper may flop in its operating movement on the surface of a windshield.

4. In a windshield cleaner, a wiper, an arm provided with an angularly extending finger at its end, and means for detachably securing said wiper and arm comprising means fixedly mounted at one end on said wiper embracing the arm at a point spaced from the finger end thereof and through which said finger may be passed and a securing means mounted on said wiper having an opening through which the finger extends to mount the wiper on said arm, said securing means being movable at the other end relative to said wiper to permit withdrawal of said finger from its opening in said securing means.

5. In a windshield cleaner, a wiper, an arm provided with an angularly extending finger at its end, and means for detachably securing said wiper and arm comprising a member mounted on said wiper embracing the arm at a point spaced from the finger end thereof and through which said finger may be passed and a resilient securing member mounted on said wiper having an opening through which the finger extends to mount the wiper on said arm, said securing member being movable by flexing thereof relative to said wiper to permit withdrawal of said finger from its opening in said securing member.

6. In a windshield cleaner, a wiper, an arm provided with an angularly extending finger at its end, means for securing together said wiper and arm comprising a resilient member in substantially a single plane having a plurality of openings therein through a selected one of which said finger extends, the lateral edges of the selected opening at the opposite surfaces of said member engaging said finger to permit, but limit, the relative rocking movement of the arm and wiper, and means carried by said wiper for embracing said arm at a point spaced from the finger end thereof to maintain the substantial parallelism of said wiper and arm.

7. In a windshield cleaner, a wiper blade, an arm, securing means for said blade and arm comprising a member extending along on the inside of the back of said blade with its ends projecting through the back of said blade, said ends being attachable to said arm.

8. In a windshield cleaner, a wiper blade, an arm, securing means for said blade and arm comprising members cut and raised from the stock of said wiper blade and provided with openings to receive said arm.

In testimony whereof I affix my signature.
EDWARD E. PIERCE.